(12) United States Patent
Gray

(10) Patent No.: US 8,408,911 B2
(45) Date of Patent: Apr. 2, 2013

(54) MOTORCYCLE WHEELIE TRAINING DEVICE

(76) Inventor: Steven Gray, San Francisco, CA (US)

( * ) Notice: Subject to any disclaimer, the term of this patent is extended or adjusted under 35 U.S.C. 154(b) by 985 days.

(21) Appl. No.: 12/288,308

(22) Filed: Oct. 18, 2008

(65) Prior Publication Data

US 2010/0096833 A1 Apr. 22, 2010

(51) Int. Cl.
*G09B 9/04* (2006.01)
(52) U.S. Cl. .................................. 434/61; 472/89
(58) Field of Classification Search .................. 434/61; 472/89; 410/9
See application file for complete search history.

(56) References Cited

U.S. PATENT DOCUMENTS

| | | | |
|---|---|---|---|
| 5,076,792 A | * | 12/1991 | Niermann ........................ 434/61 |
| 5,240,417 A | | 8/1993 | Smithson |
| 5,662,556 A | * | 9/1997 | Gangloff ........................ 482/38 |
| 5,730,453 A | * | 3/1998 | Owsen .......................... 280/282 |
| 6,123,547 A | * | 9/2000 | Teresi .............................. 434/61 |
| 6,126,571 A | * | 10/2000 | Parks ................................ 482/4 |
| 7,270,545 B2 | * | 9/2007 | Milner ............................. 434/61 |
| 2002/0055422 A1 | * | 5/2002 | Airmet et al. .................... 482/61 |
| 2002/0063047 A1 | | 5/2002 | Burnett |
| 2003/0024752 A1 | | 2/2003 | Mayer |
| 2005/0175968 A1 | | 8/2005 | Miller |
| 2006/0078854 A1 | * | 4/2006 | Bond .............................. 434/66 |

FOREIGN PATENT DOCUMENTS

JP 04-051078 A 2/1992

* cited by examiner

*Primary Examiner* — Gene Kim
*Assistant Examiner* — Joseph B Baldori
(74) *Attorney, Agent, or Firm* — Adam W. Bell; Matthew Kaser

(57) ABSTRACT

The present invention provides an apparatus and a method for using the apparatus for safely training a motorcycle rider to perform a wheelie, either while moving or while stationary. The apparatus provides a safety system which prevents the motorcycle from tipping over backwards or sideways.

20 Claims, 13 Drawing Sheets

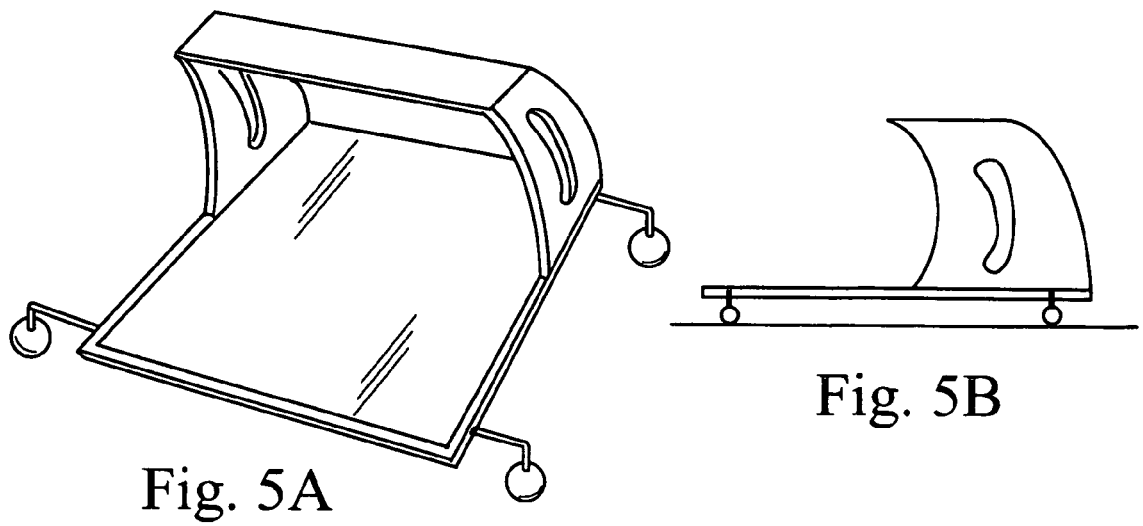
Fig. 5A
Fig. 5B
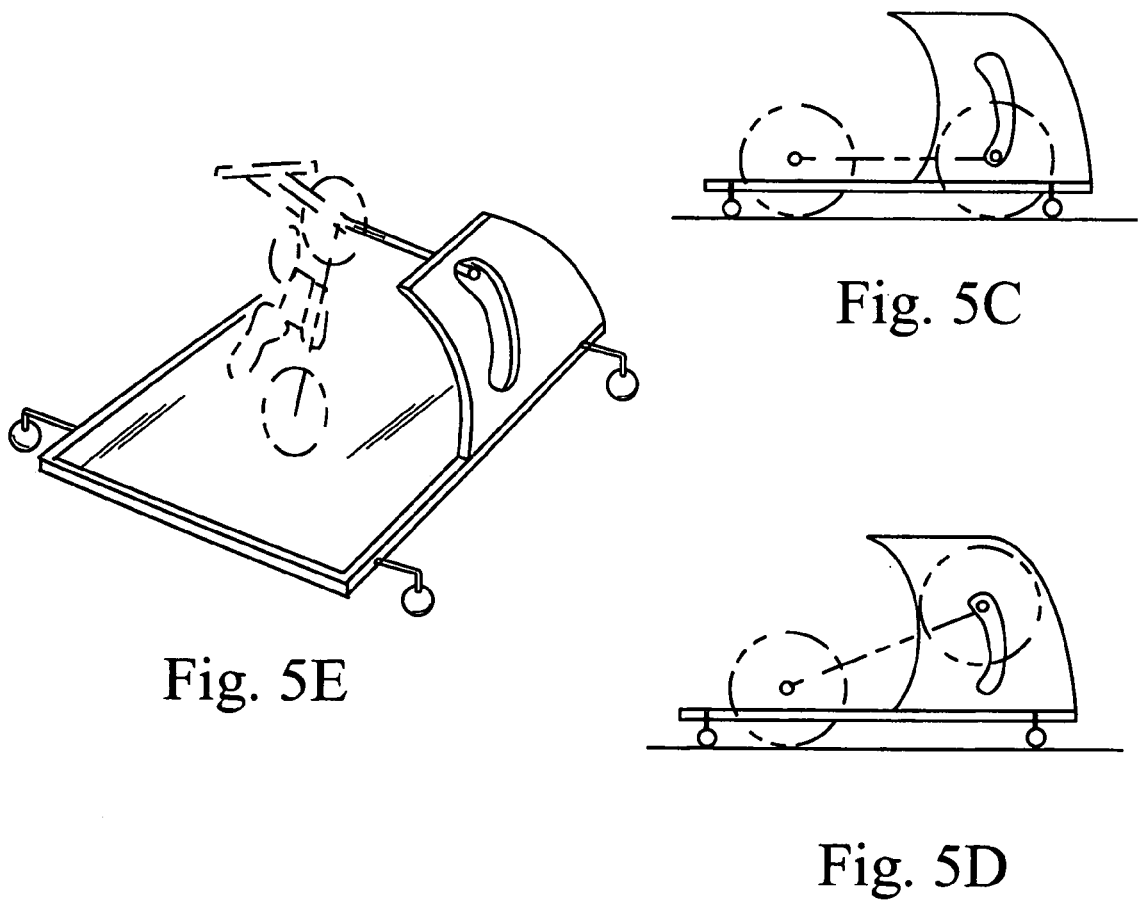
Fig. 5C
Fig. 5E
Fig. 5D

Roller a.   Roller b.   Roller c.

Roller a.   Roller b.   Roller c.

MOTORCYCLE WHEELIE TRAINING DEVICE

RELATED APPLICATIONS

None.

FIELD OF THE INVENTION

The invention is related to motorcycle riding, specifically to safely teaching a motorcycle rider to perform a "wheelie" which is an action in which the front tire of the motorcycle is raised up, above the surface of the road, so that the motorcycle is in contact with the surface of the road only by means of the rear tire.

BACKGROUND

Many motorcycle riders would like to be able to perform a wheelie. However wheelies require considerable skill and can easily result in injury to the rider and damage to the motorcycle. This is because it is difficult to apply the right amount of power to the moving vehicle such that there is sufficient lift to raise the front of the bike to the balancing point, but without applying too much power and lift taking the bike past the balancing point and resulting in the motorcycle tipping over backwards or falling over sideways. Because of these risks, to the person and the machine, most motorcycle riders do not attempt to perform wheelies, although in the inventor's experience most riders would like to.

A number of relevant publications exist including the following, below. EP1184272B1 "Wheelie prevention device for a motorcycle and method for preventing a wheelie of a motorcycle", filed: 31 Aug. 2001. This disclosure describes a wheelie prevention device and method for preventing a wheelie of a motorcycle for a motorcycle comprising a controller for controlling an output of a power source of the motorcycle and detecting an acceleration of the motorcycle, wherein a current and/or imminent wheelie state of the motorcycle is determined in accordance with the detected acceleration and the output of the power source of the motorcycle is lowered when the current and/or imminent wheelie state of the motorcycle is determined. This invention clearly lacks various necessary mechanical elements of the present invention including any mechanical means for physically limiting the upward movement of the motorbike. This disclosure required the retrofitting of a controller unit and works in an entirely different way from the current invention.

U.S. Pat. Nos. 5,240,417, 5,364,271 and WO9216267A2 "Bicycle and motorcycle riding simulation system" describe an arcade game comprising a dummy motorcycle combined with a computer and video display. It allows the user to control the video display in response to pedaling or throttle position as well as braking and steering. This invention clearly lacks various necessary mechanical elements of the present invention.

U.S. Pat. No. 7,270,545 (and US20050175968A1) "Motorcycle wheelie simulator" Filed: 18 Jun. 2004. This patent describes a motorcycle wheelie simulator for performing realistic motorcycle stunts while stationary. It uses a motorcycle, a restraint bracket, a road simulation means, a failsafe mechanism frame savers, an exhaust vent system, and safety protection. The restraint bracket comprises a bracket system for the attachment of the motorcycle to the apparatus. The road simulation means comprises an apparatus such as a 900 lb. Barrel that spins on two pivot points creating balance under the rear wheel or front wheel of the motorcycle for "popping a wheelie" or performing an "endo". This invention clearly lacks various elements of the present invention: the Bike must be stationary, the device uses rotating 900 lb barrel, and the invention lacks a frame attached to the front portion (e.g. the front forks) of the motorbike for physically limiting the upward movement of the motorbike. Unlike the present invention later disclosed, the prior art device does not provide the means for a progressive multi-stage learning technique i.e. stationary wheelie followed by slow wheelie followed by normal speed wheelie as skill level and confidence increase. The device does not have a solid structural support to the side of the motorcycle. The device does not have a strong mechanical limit to the motorcycle wheelie angle. The device does not provide a shock absorber for the front of the motorcycle to prevent damage to the motorcycle's own shock absorbers as often happens during wheelies. The device does not provide a fail-safe negative feedback system. Additionally the 900 lb drum is potentially very dangerous for users and spectators.

US20030024752A1 "Wheelie scooter", filed: 3 Aug. 2001. This describes a wheelie scooter which utilizes an auxiliary wheel assembly mounted aft of the rear wheel of the scooter with the rear wheel in a first position. The prior art devices uses an auxiliary wheel assembly on back of scooter the. It obviously lacks numerous mechanical elements and does not support methods of the present invention.

U.S. Pat. Nos. 4,367,883 and 4,353,571 "Wheelie support", filed 20 Jan. 1980 and 26 Sep. 1980 describe a device to enable Bicyclist to do wheelie. It uses a rod with wheel on far end, pivoted on wheel axis. This prior art disclosure is mechanically different from the present invention, it does not include a frame attached to the front portion (e.g. the front forks) of the motorbike for physically limiting the upward movement of the motorbike and does not prevent the cycle tilting over the center of gravity. Additionally the disclosure does not allow stationary wheelies, does not allow reduced speed wheelies, does not provide the means for a progressive multi-stage learning technique i.e. stationary wheelie followed by slow wheelie followed by normal speed wheelie as skill level and confidence increase, does not have a solid structural support to the side of the motorcycle, dose not provide sideways support to the motorcycle preventing sideways tipping, does not provide a shock absorber for the front of the motorcycle to prevent damage to the motorcycle's own shock absorbers as often happens during wheelies. Additionally in contrast with the present invention, it does not have as strong a mechanical limit to the motorcycle wheelie angle as the present invention does in both the Abrupt Stop and the Inflected Arc and does not provide a fail-safe negative feedback system.

Other patent disclosures such as U.S. Pat. No. 3,722,884 "Frontally raiseable vehicles amusement apparatus", U.S. Pat. No. 4,631,041 "Miniature flywheel car for side-wheelie stunts", U.S. Pat. No. 4,536,168 "Toy vehicle playset", U.S. Pat. No. 4,073,087 "Toy vehicle having parachute attached thereto", U.S. Pat. No. 6,227,120 "Simulated dragster ride", US20070298678A1 "Radio control two-wheel vehicle toy", U.S. Pat. No. 4,480,401 "Radio-controlled car" and EP1816045A1 "Anti-lock brake apparatus for motorcycle" are peripherally relevant but there are obvious mechanical differences between this prior art and the present invention.

All of the patent publications and documents referred to herein are hereby fully incorporated by reference for all purposes.

There is a long-felt need for an invention that allows the user to learn how to perform a wheelie, on their own motorcycle, while moving, without danger of flipping the motorcycle over backwards or dropping it on its side.

BRIEF DESCRIPTION OF THE INVENTION

The invention provides an apparatus and a method for using the apparatus for safely training a motorcycle rider to perform a wheelie, either while moving or while stationary. The apparatus provides a mechanical system which prevents the motorcycle from tipping over backwards or sideways. The invention comprises a frame within which the motorcycle is confined, wherein the frame allows the front wheel of the motorcycle to rise up and leave the ground but restricts the range of movement of the motorcycle and prevents the motorcycle from tipping over backwards. The frame also limits sideways motion and prevents the motorcycle from falling over sideways.

The invention comprises a "restraining frame" that is fixable to (and in use, is fixed to) some part of the frame of the motorcycle, generally to the front forks, and a "support frame" having an opposing pair of trackways disposed therein, within which support frame the restraining frame is confined. The restraining frame may move within and relative to the support frame, but only within certain well-defined limits and along a certain path. The movement of the restraining frame within the support frame is defined by a pair of trackways. The trackways may be straight or curved, and in some embodiments may be an "inflected arc" within which the outer arms of restraining frame are slideably fixed. When the motorcycle performs a wheelie, the front of the motorcycle is raised up and the outer arms of the restraining frame are able to slide through the arc defined by the curved trackway. The range of motion of the motorcycle is restricted so that the center of gravity always remains forward of the axis of the rear wheel, thereby preventing the motorcycle from tipping over backwards.

The inflected arc shape of the trackway makes it (i) energetically and (ii) geometrically impossible for the wheelie angle to go beyond the critical limit and tip the bike over backwards. This provides a fail-safe, self-limiting, negative-feedback system. The apparatus has three configurations providing three different modes of operation, namely: (a) a Rolling Wheelie, at normal speed (b) a Rolling Wheelie, at reduced speed and (c) a Stationary wheelie. These three configurations and modes of operation provide a novel three-stage learning system to train a rider to perform a wheelie.

In another embodiment, not involving a wheelie, the restraining frame may be attached to the front forks using side arms having one or more joints or pivots so as to allow bike to lean while moving forward and whilst providing sideways support to stop bike from tipping over. This allows rider to practice broad-siding the bike in wet road conditions.

The restraining frame (and all other components of the invention) may be made of any rigid material such as metal, such as steel or aluminium, or carbon-fiber composite or any other suitable material. The restraining frame is securely but removably fixable to a part of a motorcycle, for example to the front forks. The restraining frame is usually fixed to the motorcycle at at least two points, such as at the two front forks.

The restraining frame includes a right securing means and a left securing means by which the restraining frame is fixed to the motorcycle. Generally the right securing means will be removably but securely fixed to the right front fork, and the left securing means will be removably but securely fixed to the left front fork.

The securing means are generally an integral part of the restraining frame and may be connected, either directly or indirectly, to a right outer arm and a left outer arm as shown in the figures. The securing means may comprise, for example, one or more of the following: a clamp, a strap, a nut-and-bolt system, a luer-lock system, a slot-and-flange system, or any other suitable system capable of removably but securely fixing the restraining frame to the front forks (or other part) of the motorcycle. One preferred embodiment employs a high tensile ribbon that is wrapped once around each fork and tightened with a ratchet assembly which is integral to the restraining frame. The ratchet can generate very high tension in the ribbon which provides a rigid and strong connection between the Restraining Frame and front forks.

Each of the outer arms will be designed and adapted so as to have a shaft and a head portion that will fit slideably into the curved trackway. The head portion of the outer arm is present at the outer terminal ends of the outer arms and may comprise a boss or enlarged portion or may simply be a continuation of the outer arm that fits into or on to the trackway. In certain embodiments the head portion comprises a boss, larger in diameter than the shaft, wherein the boss can be inserted into the trackway such that it rests behind and is slideably restrained by two parallel rails set above a channel that forms the trackway.

Each of the outer arms of the restraining frame are fixed relative to each other, either directly or indirectly, by a structural element such as an angular or curved bar as shown in the figures, herein called a "connecting means" (5). One or more structural elements may be used to connect the right and left outer arms of the restraining frame and any suitable means may be employed. The restraining means shown in the figures is merely one possible exemplary embodiment and the invention is not restricted to the shape, size or design of the embodiments show so long as the restraining means provides the functionality discussed herein.

The support frame has disposed therein an opposing pair of trackways within which the restraining frame is confined. The support frame may be made of any rigid material such as metal, such as steel or aluminium, or carbon-fiber composite or any other suitable material. In a preferred embodiment the support frame comprises a horizontal bottom frame having two longer sides and two shorter sides wherein the shorter sides define the back and the front of the bottom frame, and having a plurality of wheels mounted upon the underside thereof, and a top frame mounted upon the bottom frame. In an alternative embodiment (the "stationary wheelie" embodiment) the bottom frame does not have wheels but uses skis/skids, as further discussed, below. The top frame comprises two vertical and approximately parallel side walls, and, optionally, a top structure joining the side walls. Optionally the top structure may be a flat plate fixed substantially orthogonally to both side walls. The top structure may be of any shape such as flat or curved. The top structure may equally comprise bars or rods or any other structure to provide stability between the parallel side walls. Each side wall defines one trackway disposed therein to as to provide an opposing pair of trackways. Each trackway is shaped and sized so as to accept an outer arm of the restraining frame, so that said outer arm may be slideably confined within the trackway.

The side walls need not be walls, but may be columns or rods or frames of any size or shape that define the trackways.

Note that the bottom frame as discussed herein need not be restricted to a box or rectangle or parallelogram, but may be round or horse-shoe shaped or oval or may be any other suitable shape so long as it functions as described to support the top frame.

In one alternative embodiment the apparatus employs only one outer arm, on one side of the motorcycle, slideably fixed within a single trackway of the support frame. In this embodiment the top frame need have only one side wall and indeed the supporting structure defining the trackway need not be a wall at all, but may be any column or bar or plate positioned vertically upon the bottom frame so that it defines a trackway.

In another embodiment the apparatus employs one outer extending both to the right and the left of the motorcycle, and fixed to either both forks or fixed to only a single fork or to some other part of the vehicle but slideably fixed to both trackways.

In one alternative embodiment the apparatus comprises at least one free-wheeling roller mounted within the bottom frame. The roller may be made of any suitable material such as steel, carbon fibre etc. and mounted on an axle to allow rotation about the axle. The free-wheeling roller is generally positioned forward of the rear wheel when the motorbike is horizontal with both wheels on the ground. When performing a wheelie, the front of the motorbike rises vertically, the front wheel lifts off the ground, and the horizontal distance between the front wheel and the rear wheel is shortened. The rear wheel moves forward relative to the bottom frame, and the rear wheel contacts the free-wheeling roller which is then forced to spin. As the front of the motorcycle lifts of the ground and moves into the inflection, the rear wheel is partially or fully lifted off the ground as it contacts the roller. The energy and driving force for the wheelie is dissipated as the rear wheel is no longer in contact with the ground, and the motorcycle then starts to drop down again. The Inflected Arc combined with the free-wheeling roller makes it impossible for the wheelie angle to go beyond the critical limit and tip the bike over.

Alternate embodiments comprise two or more rollers set side by side within the bottom frame.

In some embodiments the roller imparts very little resistance to rolling, but in others the roller resists rotation and may be restrained in its ability to move by any means of providing such limitation, such as by a friction brake or gears or pulleys or by an air brake or simply by virtue of its mass.

The roller embodiment may be used with a device and method wherein the front forks move so as to define an inflected arc and the inflected arc travel of the front forks is produced either by (i) the trackway having an inflected arc geometry or from (ii) straight trackways combined with the bike rear moving forwards and onto the free-wheeling roller.

The trackways may be curved and may define an arc, such as an inflected arc. In an alternative embodiment trackways are straight, vertical trackways, not arcs.

In one alternative embodiment the horizontal bottom frame and a top frame may move relative to each other when a force is applied on the top frame such that the top frame may slide forwards and backwards upon the bottom frame. In such an embodiment the entire supporting frame structure may be mounted on sliders such that it can slide forwards and backwards on the box-frame. As the motorcycle front lifts up during a wheelie, the Restraining Frame lifts up in the vertical trackways. Also, as the motorcycle front lifts up and start to rotate, the horizontal distance between the front forks and rear wheel decreases and this causes the Supporting Frame to slide towards the rear of the motorcycle. The forwards/backwards movement of the sliding Support Frame combined with the vertical movement of the Restraining Frame in the Supporting Frame results in a radial travel of the Restraint Frame similar to that provided by the fixed curved trackway in the previous embodiment.

In another embodiment the top frame may rotate relative to the bottom frame when a suitable directional force is applied on the top frame. The rotation is in the plane of the bottom frame and the support frame rotates co-axially to the forks. Such rotation allows the front forks to steer in the device.

In one basic embodiment the outer arms are rigid and not articulated. But in an alternative embodiment the outer arms articulated using a sliding and/or hinged and/or pivoting assembly which allows the forks to move relative to the head portions of the outer arms. This allows a rider to practice a controlled lean of the bike to allow "broadsiding" practice while preventing the bike from falling over to the side. When the rear wheel of a motorcycle loses grip during a turn either due to wet conditions, a dry skid or a power slide, the rear wheel slides out to the side. This can be difficult to control and can lead to the bike falling over. This embodiment of the invention, in which the restraining frame is fixed to the front forks using a sliding and/or pivoting assembly, allows the rider to perform controlled rear wheel sliding (broadsiding) without danger of the bike falling over sideways. This is achieved by an alternate design of restraining frame that allows the bike to lean but limits the extent of the lean. This configuration does not allow wheelies; this configuration is used only to practice broad siding. The basic structure that allows wheelies actually prevents almost any lean at all. The broadsiding modification allows the forks to pitch and/or roll and/or yaw in the restraining frame allowing a broadsiding manoeuvre, but still does not allow any excessive or undesirable lean of the bike (see figures).

In the broadsiding embodiment the right outer arm and the left outer arm of the restraining frame may be hinged and/or pivoted and/or may employ one or more universal joints so as to allow the forks to move (pitch, roll or yaw) within the restraining frame relative to the head portions of the outer arms.

Another broadsiding embodiment uses a similar configuration of sliding and pivoting assemblies but the hinges pivot in a different plane allowing rotation in a different plane i.e. lean versus steering. To allow the bike to steer and lean, a combination of the embodiments is required such that pivoting can occur in two planes.

The embodiment wherein the restraining frame is fixed to the front forks using a sliding and/or pivoting and/or jointed assembly allows the front forks to turn therefore helping the rider to steer the bike (and device) between wheelies. It also allows the rider to rotate the forks during a wheelie giving a more realistic experience.

The broadsiding embodiment may also employ a plurality of cords that are attached to (i) a sturdy feature of the rear of the motorcycle e.g. rear foot pegs and (ii) the top section of the supporting frame. These cords give an additional means of limiting the extent of lean of the motorcycle.

A further alternative embodiment of the invention allows a slow wheelie to be performed. In this embodiment the horizontal bottom frame does not have wheels or castors mounted thereon but instead contacts the ground directly such that the device is simply dragged along the road by the power of the bike. Skis or skids may be fitted on the underside of the bottom frame. Such skids may be made from any suitable material such as wood, carbon-fiber, metal, or any polymer or plastic. Such skids will generate friction. The bike will have to generate much higher torque than normal to move the bike and device along the road. This higher torque enables the bike to perform wheelies at slower speeds than normal. This embodiment can be used with the standard "normal speed wheelie" configuration summarized herein. This skid embodiment converts the standard configuration into a "reduced speed wheelie" embodiment without the use of the rollers and reducing gears describe elsewhere in the application. The skid embodiment can also be combined with the configuration employing rollers or gears for performing slow wheelies. The skid embodiment can also be used in combination with castor wheels whereby the number of castor wheels and/or their height can be adjusted to increase/reduce the weight on the skis by sharing the weight between the skis and wheels by varying degrees so that the magnitude of the frictional force is modulated in order to modulate the amount of torque the bike the needs to generate in order to move the device along the road. This therefore modulates the slow wheelie method by increasing or decreasing torque produced by the motorcycle.

In a modification of the skid embodiment, only a portion of the support frame slides. The sliding portion is a horizontal section that houses the vertical trackway that guides the restraining frame. This results in less sliding mass and brings the obvious concomitant advantages, for example it does not require the whole support frame to slide backwards and forwards. The important aspect of this variation of the above embodiment is that, at a minimum, the portion of the frame that has houses the vertical trackways is able to slide backwards and forwards. Either the whole support frame may move or only that section houses the vertical trackway may move.

In another embodiment the device provides a configuration enabling the rider to practice broadside maneuvers. This embodiment encompasses a configuration in which one or more cords is attached to both sides of the rear section of the motorcycle (at any point to the rear of the rider such as on the frame behind the seat or supporting or close to the rear wheels) and wherein the cords are also attached the top of a support frame as shown in FIG. 12. The cords may be any suitable elongated securing means such as straps, cords, rope, wire etc, and may have no, little, or considerable elasticity. The support frame may comprise a beam or arch or may consist of one or more poles or rods secured to the bottom frame and mounted above the motorcycle to provide one or more attachment points above the motorcycle. The cords allow a limited degree of motorcycle lean during broadside practice, but as the lean angle increases, the limit of the cord length is reached and no more lean is possible, thus the embodiment prevents the bike from tipping over on its side during a broadside maneuver. A specific embodiment employing the apparatus is a system for safely training the rider of a two-wheeled or a three-wheeled vehicle to perform a broadside maneuver, the system comprising a two-wheeled or a three-wheeled vehicle and a training apparatus, the training apparatus comprising a horizontal bottom frame and a support frame fixed thereto, and at least two cords attached to the support frame at one or more attachment points above the height of the vehicle, wherein the cords are each further attached to the vehicle at one or more attachment points on the rear half of the vehicle wherein the cords allow a limited degree of lean of the vehicle during a broadside maneuver.

We also need to include a claim or embodiment where the entire support frame structure rotates on the box frame as an alternate means of allowing the front forks to steer in the device. The support frame rotates co-axially to the forks.

The invention encompasses the following exemplary, non-exclusive embodiments:

An apparatus for safely training a motorcycle rider to perform a wheelie comprising a restraining frame that is securely but removably fixable to the front forks of a motorcycle, wherein the restraining frame comprises a right securing means and a left securing means, and a right outer arm and a left outer arm; and a support frame, wherein the support frame comprises a horizontal bottom frame having a plurality of wheels mounted upon the underside thereof, and a top frame mounted upon the bottom frame, wherein the top frame comprises two vertical and approximately parallel side walls, and a top structure fixed to both side walls, wherein each side wall defines one trackway disposed therein to as to provide an opposing pair of trackways, wherein each trackway is shaped and sized so as to accept an outer arm of the restraining frame, so that said outer arm may be slideably confined within the trackway. The movement of the restraining frame is restricted by the geometry of the trackways which may be shaped as a simple radial arc, an inflected arc or may be substantially straight and vertical.

The apparatus usually comprises a support frame either securely or slideably fixed relative to the bottom frame allowing the horizontal bottom frame and a top frame may move relative to each other when a force is applied on the top frame such that the top frame may slide forwards and backwards upon the bottom frame.

The bottom frame may be rectangle having two shorter sides defining the front and the back of the bottom frame and two longer sides defining the sides of the bottom frame, and may have a plurality of wheels (for example three, four, six or eight wheels or casters) attached to the bottom of the bottom frame to as to allow it to roll across the ground.

The apparatus may further comprise one or more rollers, which maybe a free-wheeling roller, mounted within the bottom frame wherein the free-wheeling roller is positioned forward of the rear wheel when the motorbike is horizontal with both wheels on the ground.

The invention also encompasses a system for safely training a motorcycle rider to perform a wheelie comprising a motorcycle and an apparatus as herein described wherein the restraining frame is fixed to the front forks of the motorcycle. The range of motion of the motorcycle is restricted so that the center of gravity always remains forward of the axis of the rear wheel, thereby preventing the motorcycle from tipping over backwards. In some embodiments the horizontal bottom frame and a top frame may move relative to each other when a force is applied on the top frame such that the top frame may slide forwards and backwards upon the bottom frame.

The invention also encompasses a method for training a motorcycle rider to perform a wheelie, the method comprising: A. providing a rider and a motorcycle having front forks, B. providing an apparatus as defined herein, C. fixing the motorcycle to the restraining frame by fixing the securing means to the front forks of the motorcycle, D. placing the outer arms within the trackways, and E. performing the following exercises: (i) performing a number of stationary wheelies (ii) performing a number of moving wheelies. In some embodiments the exercises may be: (i) performing a number of stationary wheelies (ii) performing a number of rolling (moving) wheelies at reduced speed (for example at less than 10 mph), and (iii) performing a number of rolling (moving) wheelies at normal speed (for example at more than 10 mph).

BRIEF DESCRIPTION OF THE FIGURES

FIG. 5A-E illustrate the support frame and the position of the motorcycle relative to the support frame when in use, performing a wheelie. Note that the arms of the restraining frame cannot move beyond the limits of the curved trackways and thus the motorcycle is prevented from tipping over backwards.

FIG. 11A: Schematic of the trackway from the trackway embodiment, no motorcycle shown. FIG. 11B: Motorcycle in trackway, no wheelie (bar linking cycle to trackway not shown). FIG. 11C: Motorcycle in trackway, start of wheelie. FIG. 11D: Motorcycle in trackway, wheelie continues & is guided by trackway. FIG. 11E: Wheelie reaches inflection in trackway, motorcycle about to move up and follow the trackway and rear wheel therefore about to move up onto to free wheeling roller (a). FIG. 11F: Wheelie has taken motorcycle into the inflection, rear wheel has transferred to free-wheeling roller (a) which provides no reaction to the drive of the rear wheel. Therefore the driving force for the wheelie has been removed. Motorcycle therefore drops back down onto rollers (b) & (c) and cannot reach the tipping point. The rider feels this and therefore reduces power and learns to balance bike before wheelie reaches the inflection.

DETAILED DESCRIPTION OF THE INVENTION

Definitions

Figure 1A:
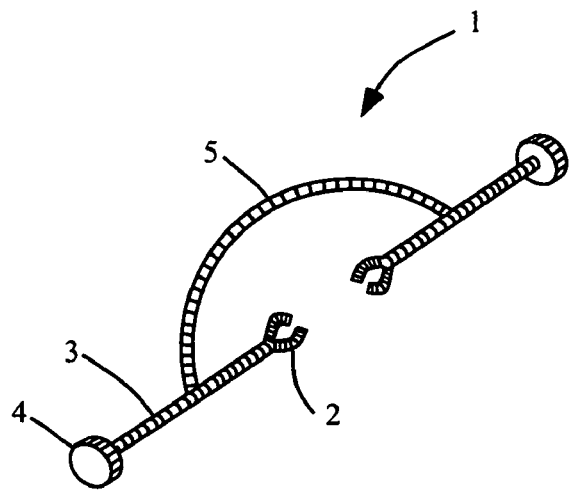
FIG. 1A illustrates the restraining frame (1) with securing means (2) outer arm (3), head portion (4), connecting means (5).

The term "Motorcycle" includes all two-wheeled and three-wheeled motorized vehicles (tricycles). In this disclosure, the invention relates equally to un-motorized vehicles such as bicycles, but the examples are directed to motorized vehicles.

The term "wheelie" refers to an action in which the front tire of the motorcycle is raised up, above the surface of the road, so that the motorcycle is in contact with the surface of the road only by means of the rear tire.

The term "stationary wheelie" refers to a wheelie done while the vehicle is not significantly moving forwards or backwards.

The term "rolling wheelie at reduced speed" refers to a wheelie done at a slow speed, for example at between 1-20 mph, or between 1-10 mph, or between 1-5 mph.

The term "rolling wheelie at normal speed" refers to a wheelie done at a moderate speed, for example at between 5-40 mph, or between 10-30 mph, or between 20-30 mph.

The term "slideably confined" when used to describe he relationship between an outer arm and a trackway means that the outer arm is positioned or sitting or resting within the trackway so that it can slide, but only within the trackway.

The term "securing means" refers to any mechanical means of securing one thing to another, either, for example, permanently or removably or slideably.

The term "plurality" means one or more.

General Representations Concerning the Disclosure

In this specification where reference is made to particular features of the invention it is to be understood that the disclosure of the invention in this specification includes all appropriate combinations of such particular features. The embodiments disclosed in this specification are exemplary and do not limit the invention. As used in this specification, the singular forms "a", "an", and "the" include plural reference unless the context clearly dictates otherwise. The term "comprises" and grammatical equivalents thereof are used in this specification to mean that, in addition to the features specifically identified, other features are optionally present. The term "at least" followed by a number is used herein to denote the start of a range beginning with that number. Where reference is made in this specification to a method comprising two or more defined steps, the defined steps can be carried out in any order or simultaneously. This specification incorporates by reference all documents referred to herein and all documents filed concurrently with this specification or filed previously in connection with this application, including but not limited to such documents which are open to public inspection with this specification.

Elements of the invention and parts of the claimed device are sized and shaped so as to be suitable for and proportional to the size of the vehicle for which they are employed, and may be approximated from the figures. Some examples of the invention are provided by the description and the figures. The examples are non-exclusive and are illustrative only and do not limit the invention. The invention encompasses any equivalent having the same functionality and basic components if the invention herein described.

DESCRIPTION

The present invention is an apparatus which provides a means for training a motorcycle rider to perform a wheelie while providing a safety system which prevents the motorcycle from tipping over backwards or sideways. The essence of the invention is a means for providing a completely novel rotational geometry for the front of the motorcycle during a wheelie using trackways to guide the front of the motorcycle during the wheelie. The guiding trackways make it (i) energetically and (ii) geometrically impossible for the wheelie angle to go beyond the critical limit and tip the bike over backwards. This provides a fail-safe, self-limiting, negative-feedback system. The apparatus has three configurations providing three different modes of operation, namely: (a) Rolling Wheelie at normal speed (b) Rolling Wheelie at reduced speed and (c) Stationary wheelie. These three configurations and modes of operation provide a novel three-stage learning system.

The guiding trackways may be in the shape of an arc such as a simple radial arc or an inflected arc, or in other embodiments may be substantially straight.

The present invention teaches a user how to perform a wheelie without danger of flipping the motorcycle over backwards or dropping it on its side.

This is achieved by constraining the front of the motorcycle in a frame and allowing the frame to move up in an arc corresponding to a wheelie while also providing a limit to the rotational movement of the motorcycle thus providing a means for preventing it from tipping over backwards. The present invention is comprised of two essential structures. The first structure provides a constraint to the front forks of the motorcycle; the second structure serves two functions: (i) it allows the first structure to move up and down in an arc corresponding to the movement of the front of the motorcycle during a wheelie and (ii) it limits the movement of the first restraining structure to prevent the motorcycle tipping over backwards or sideways.

Figure 1B:
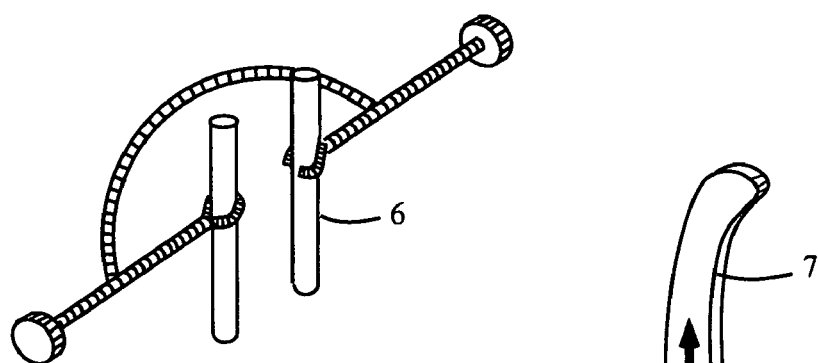
FIG. 1B illustrates the restraining frame attached to the front forks of a motorcycle (6).
Figure 1C:
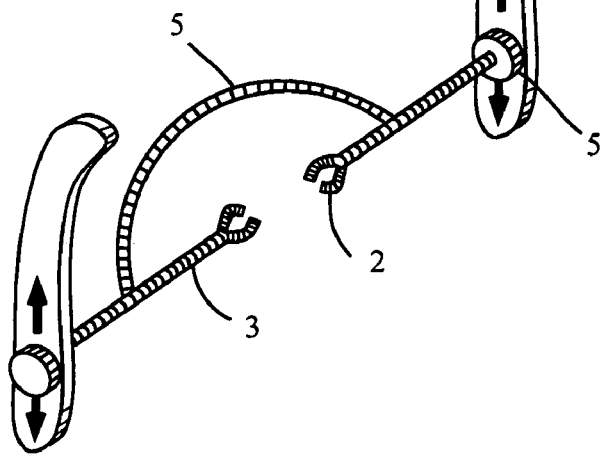
FIG. 1C illustrates the restraining frame positioned and slideably fixed between and within the opposing trackways (7).

1. The first structure of the invention is a horizontal Restraining Frame (FIG. 1).

i. The Restraining Frame has two connectors each of which connect to one of the motorcycle front forks.

ii. The connector is either a mechanical c-clamp type connector or a ratcheting high-tensile cord that wraps around each fork.

iii. The inner ends of the connectors attach to the motorcycle front forks. The outer structure of the connectors is a bar that both telescopes and hinges. The telescoping and hinging action provide a means to allow the motorcycle front forks to be turned within the Restraining Frame to provide a more realistic wheelie experience.

iv. The left and right outer-most ends of the Restraining Frame are connected via a sliding means to the second structure described below.

Figure 2:
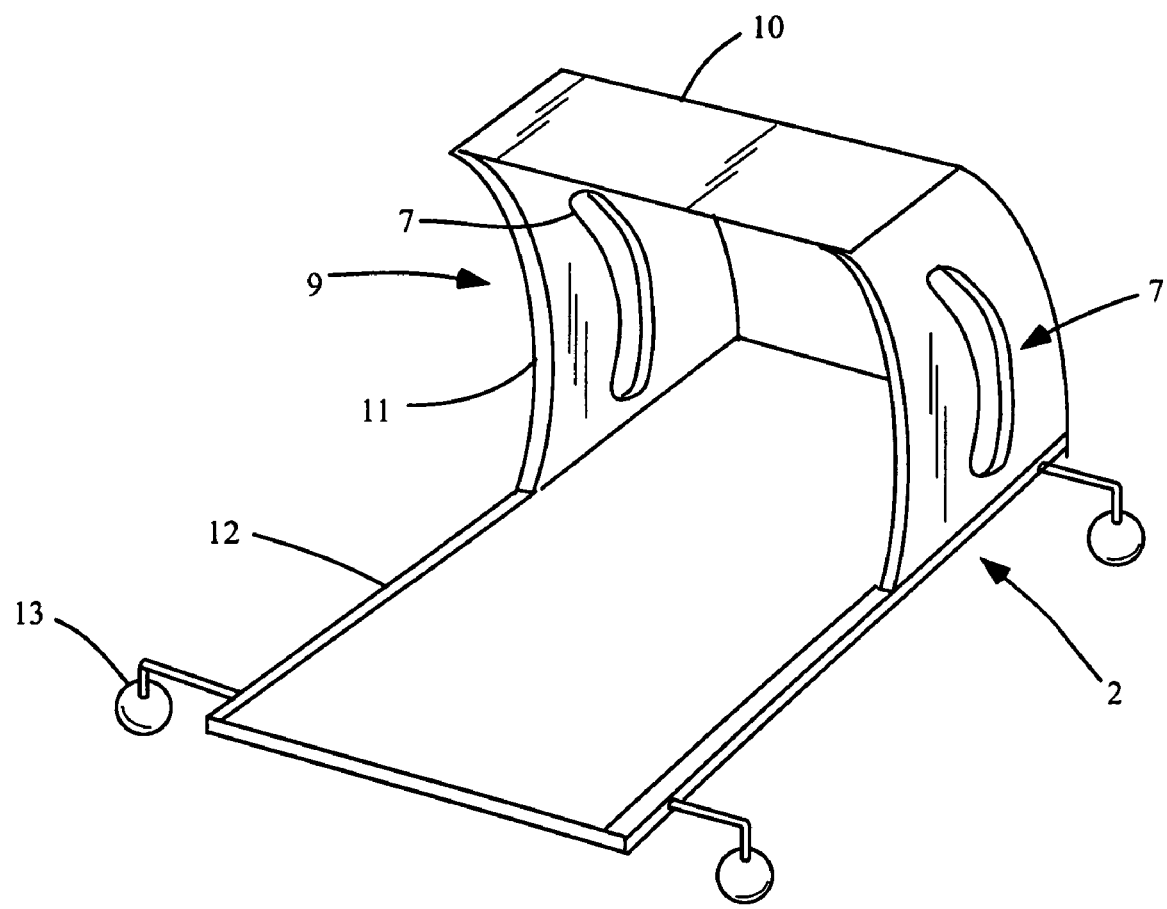
FIG. 2 illustrates the support frame having a top frame (9) with an opposing pair of trackways (7) disposed therein. The top frame comprises side walls (11) and a top structure (10), and a horizontal bottom frame (12) with wheels or casters (13) on the underside.
Figure 3:
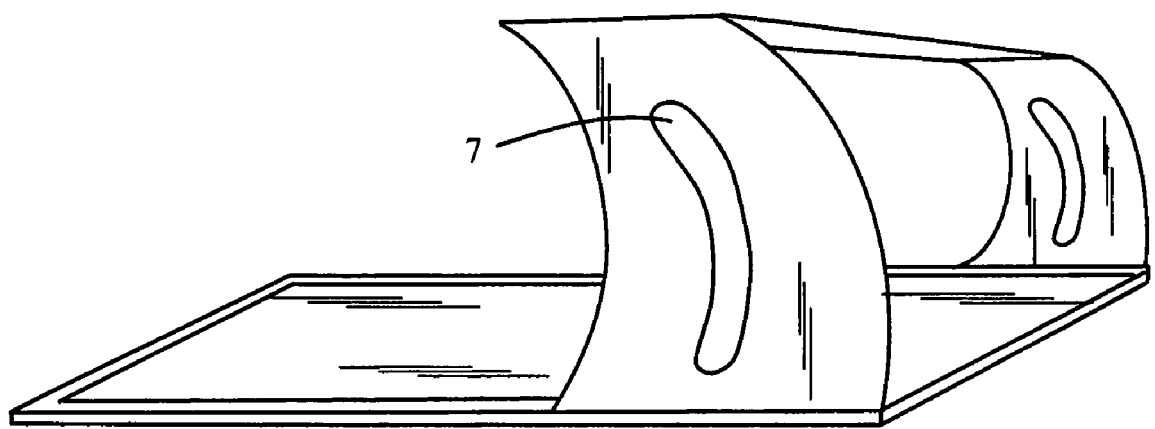
FIG. 3 illustrates a side perspective view of the support frame showing the arced trackways (7).
Figure 4:
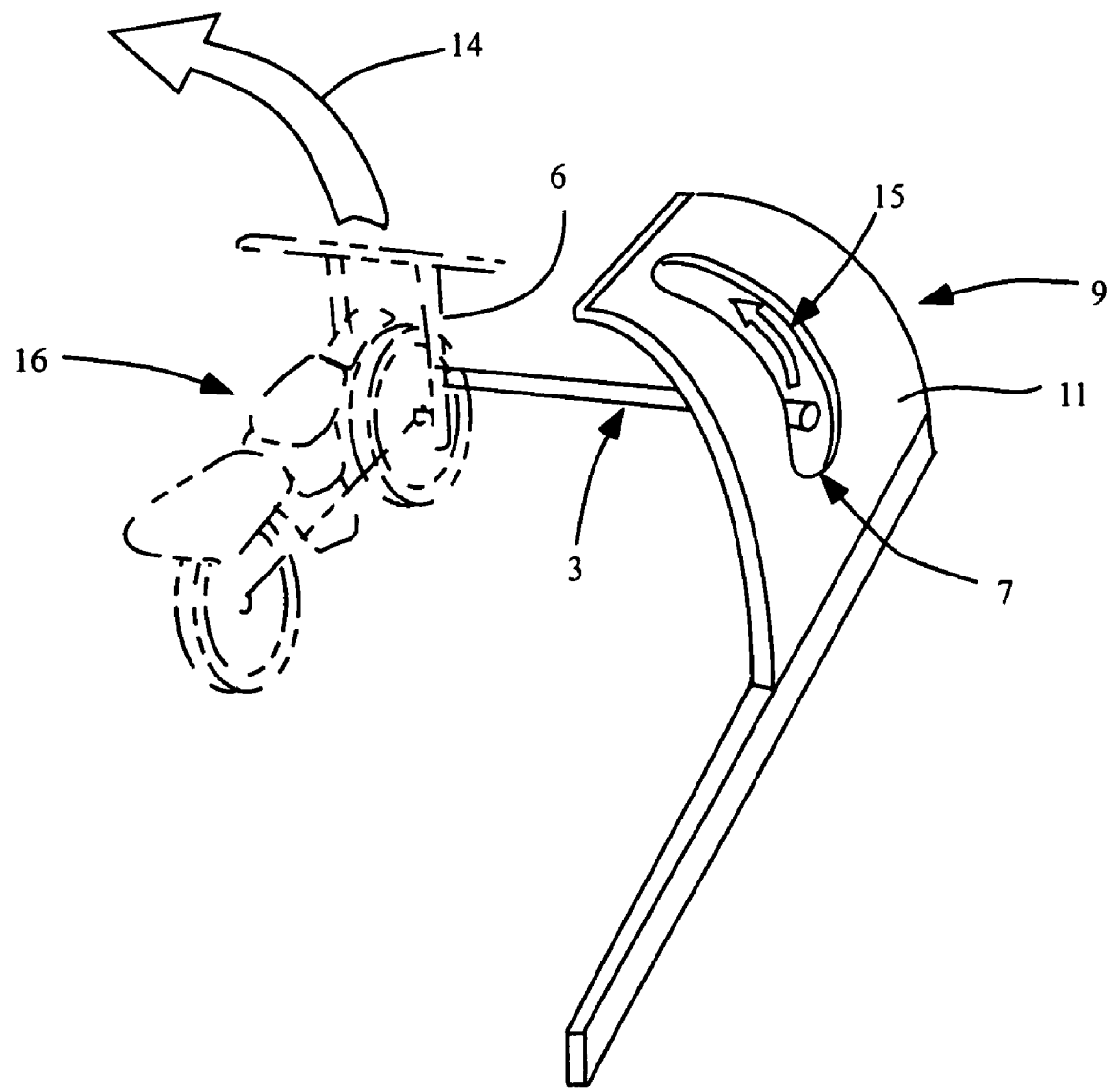
FIG. 4 illustrates a perspective view of various elements of the apparatus showing a motorcycle (16) attached via one front fork (6) to the right outer arm (3) of the restraining frame (1), wherein the right outer arm of the restraining frame is slideably fixed within one of the pair of the curved trackways (7). Only a portion of the apparatus is shown, and in use both front forks would be attached to the restraining frame and both right and left outer arms of the restraining frame would be slideably fixed, one within each of the pair of the curved trackways. The arrow (14) shows the direction of motion of the motorbike when a wheelie is performed.
Figure 6A:
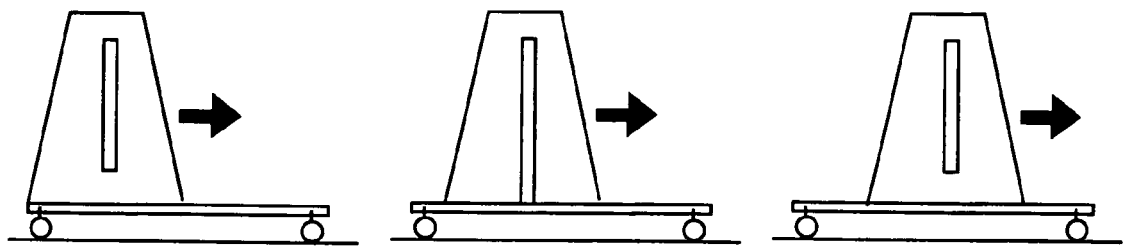
FIG. 6A-C illustrate the support frame from both a side view (6A) and a ¾ perspective view (6B), and also shows the position of the motorcycle relative to the support frame when in use, performing a wheelie (6C). The rear wheel should be on the ground in these illustrations.
Figure 6B:
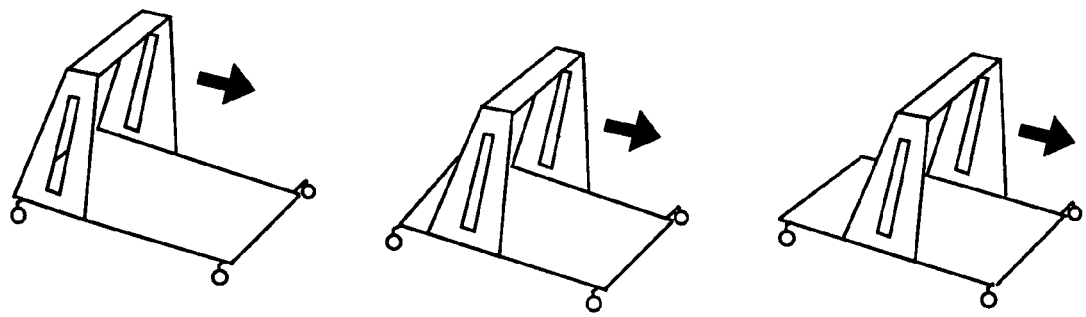
Figure 6C:
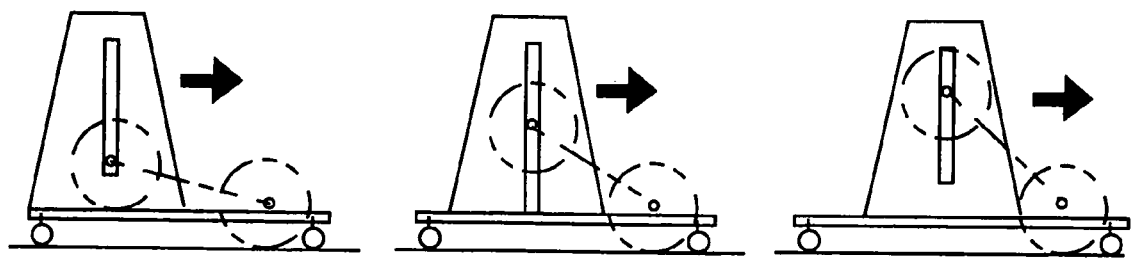
Figure 7A:
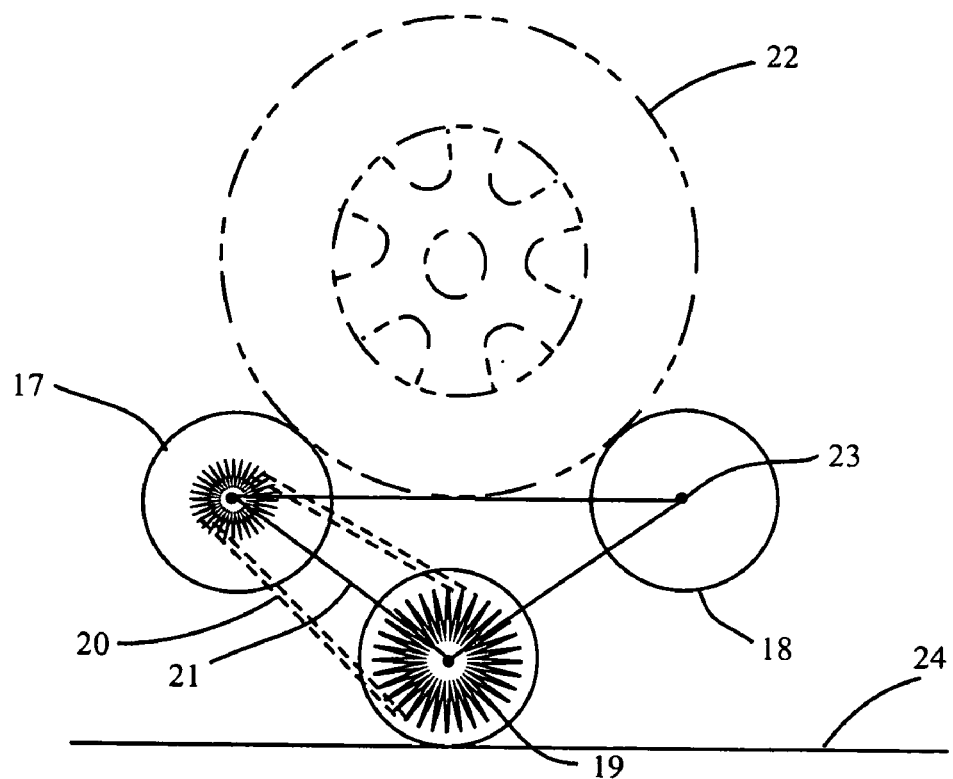
FIG. 7A-B illustrates a reduced speed wheelie apparatus with rollers (17), (18), and (19). The motorcycle wheel sits on rollers a and b. Roller a is connected to roller c by a reducing gear (20) so that roller c spins slowly. Roller c sits on the ground (24) and propels the apparatus forward at reduced speed.
Figure 7B:
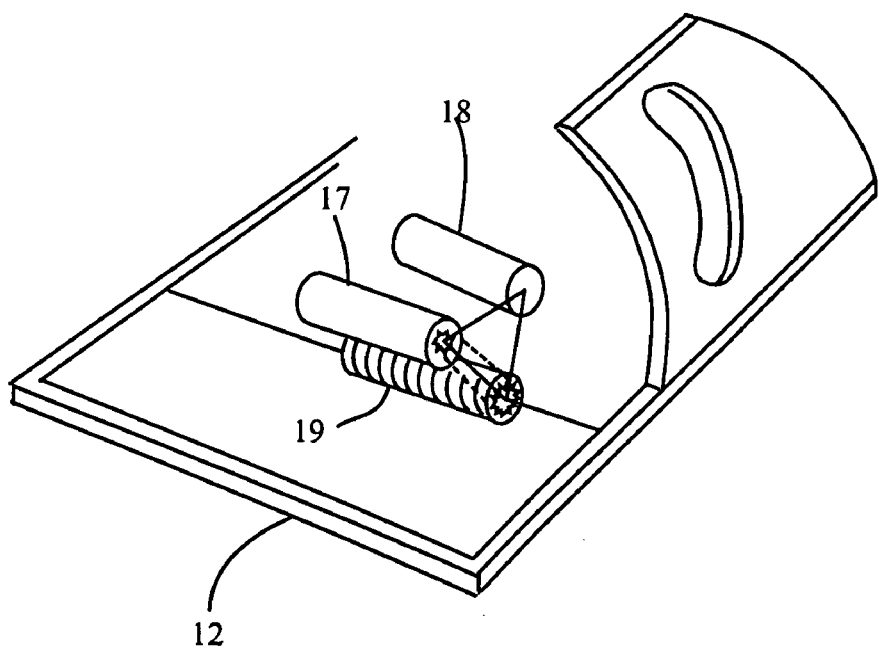
Figure 8A:
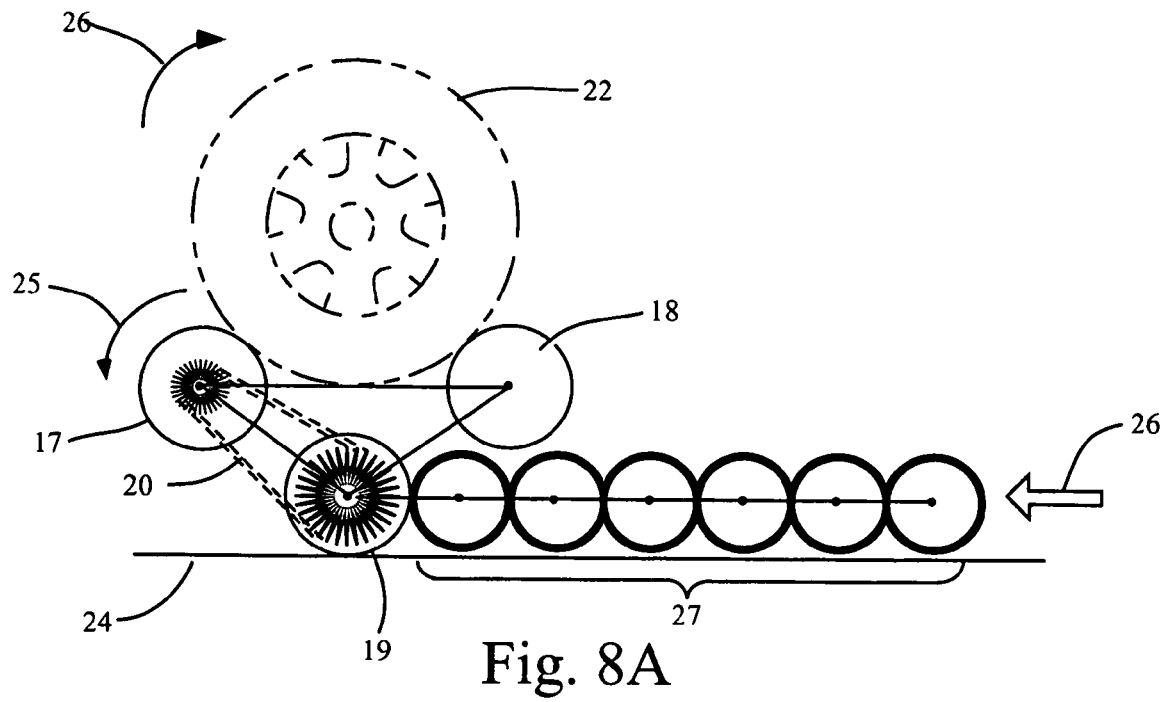
FIG. 8A-B illustrates a stationary wheelie apparatus using friction rollers. Roller 17 is connected to roller 19 by a chain or gear (20). Roller 19 is connected to a bank of rollers (27) which are under compression (28). This makes them difficult to turn and supplies the reaction "push back" to the motorcycle rear wheel enabling the wheelie.
Figure 8B:
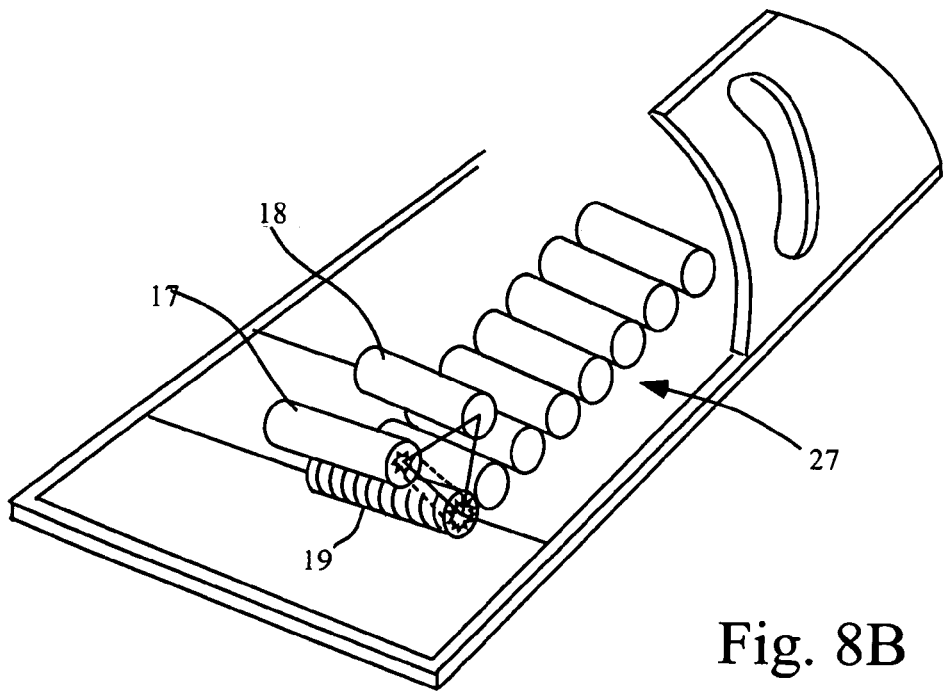
Figure 9A:
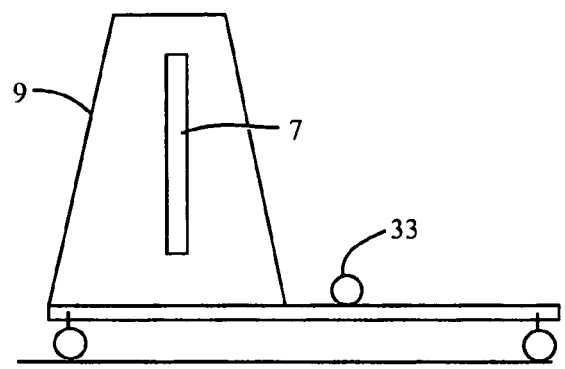
FIG. 9A-B illustrate the restraining frame additionally including a freewheeling roller (33) for performing a normal-speed wheelie and showing how the motorcycle moves forward to that the rear wheel impinges on the roller, so dissipating the torque. The rear wheel should be on the ground up until it contacts the roller.
Figure 9B:
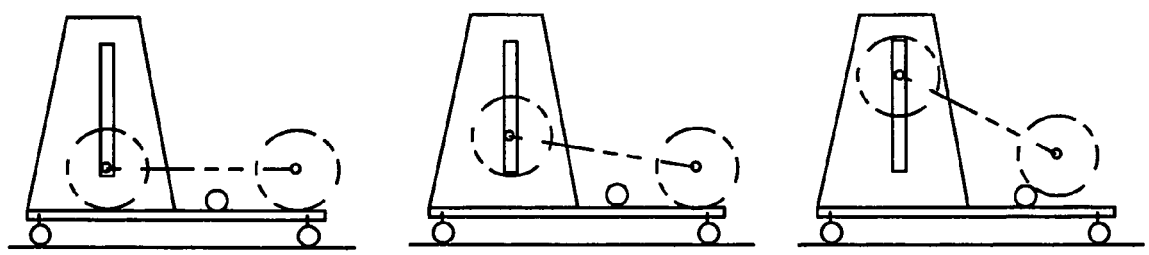
Figure 10A:
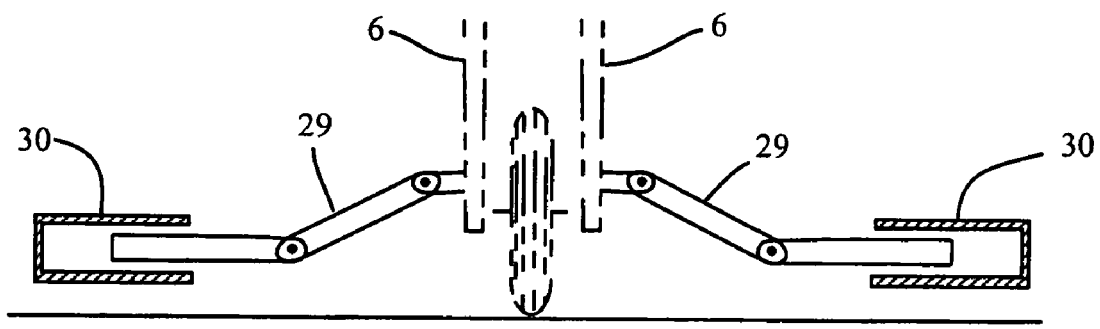
FIGS. 10A-C illustrate a restraining frame using double pivoted outer arms (29) with a first pivot (31) and a second pivot (32) in each outer arm, and a piston assembly (30) that allows the motorcycle to lean during riding (this does not involve doing a wheelie).
Figure 10B:
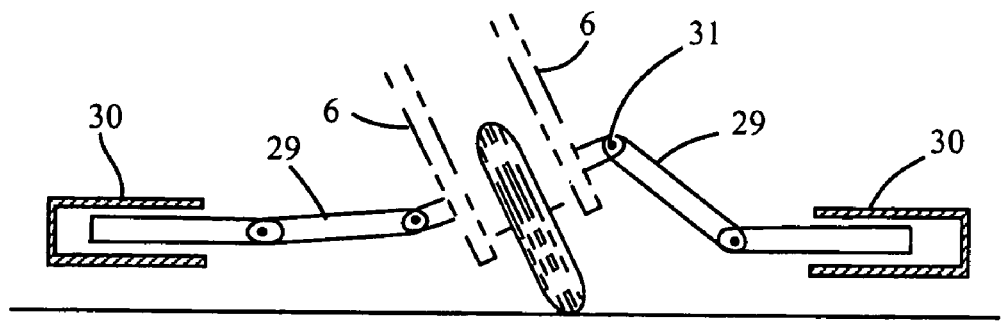
Figure 10C:
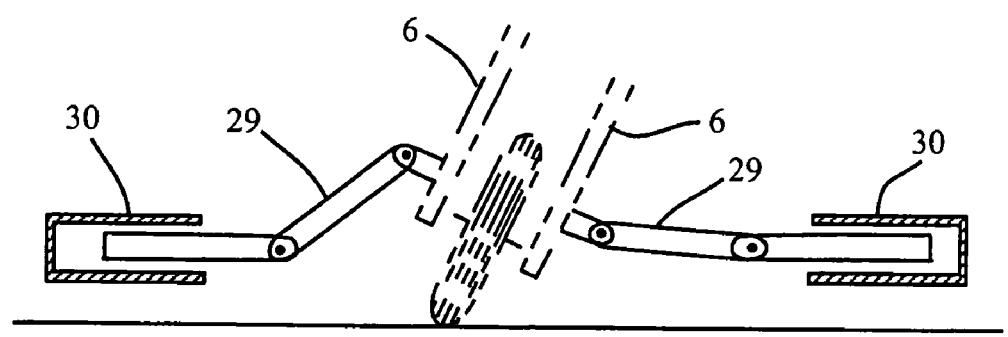

2. The second structure of the invention is a vertical Support Frame (FIG. 2,3,4,5)

i. The Support Frame has two vertical structures that sit on both sides of the front of the motorcycle. The top and bottom sections of the two vertical structures are connected by a horizontal frame to give rigidity and strength to the Support Frame. The base of the support frame can form a low-level enclosure that surrounds the motorcycle. The enclosure has a castor wheel on each corner so that it can roll along with the motorcycle before, during and after the wheelie.

ii. The two vertical sections of the Support Frame each contain a curved trackway. The curvature of the trackway corresponds to the arc of the wheelie.

iii. The first structure previously described is the Restraining Frame, the outer ends of the Restraining Frame are connected via a sliding means (e.g. bearing) to the curved trackway in the Support Frame. Therefore when the motorcycle performs a wheelie, the Restraining Frame lifts up with the front forks- and the Restraining Frame is able to move in the required arc because of the geometry of the trackway in the Supporting Frame.

iv. The curved trackway also provides the crucial function of providing an upper safety limit to the rotational movement of the motorcycle during the wheelie thus preventing the wheelie angle from going beyond the critical point and thus preventing the motorcycle from tipping over backwards.

v. The lateral rigidity of the Restraining Frame/front forks connection combined with the lateral rigidity of the Restraining Frame /Support Frame connection provides lateral stability to the motorcycle and so provides a means to prevent it from falling over on its side.

vi. The curved trackway provides the safety limit to the wheelie rotation by one of two means:

a. Abrupt Stop. The curved trackway has an abrupt end which provides a limit to the travel of the Restraining Frame.

b. Inflected Arc. With this configuration the curved trackway has an inflection near its upper end such that the curvature bends upwards away from the constant radius curve. It also has a free-wheeling roller fixed to the low-level enclosure. The free-wheeling roller sits off the ground and in front of the motorcycle rear wheel. The free-wheeling roller in conjunction with the inflected arc provide the following function:

I. As the wheelie angle increases, the Restraint Frame eventually moves up into the inflection. Because of the geometry of the inflection, the only way for the wheelie angle to increase further is for the front of the motorcycle to rise up into the inflection. This then lifts the rear wheel off the road and onto the free-wheeling roller. As the rear wheel moves onto the free-wheeling roller, the reaction force or "pushback" on the rear wheel is removed. This reaction force is what enables the wheelie, therefore the driving force for the wheelie is removed.

II. The Inflected Arc combined with the free-wheeling roller makes it (i) energetically and (ii) geometrically impossible for the wheelie angle to go beyond the critical limit and tip the bike over. It is energetically impossible because the wheelie enabling reaction force and energy is taken way at the critical angle by virtue of the rear wheel lifting off the ground. It is geometrically impossible because the inflected path trackway provides a geometrical limit to the angle of the wheelie.

3. Alternate means of controlling the arc of the Restraining Frame. The means described in part 7 (ii) uses a fixed curved trackway in the Supporting Frame to allow the Restraining Frame to move in an arc corresponding to the wheelie. An improved means is achieved by the following.

i. Like the previous embodiment, the alternate Support Frame has two vertical structures with two horizontal frames linking their top and bottom sections for rigidity and strength. In this embodiment the base of the support frame must form a low-level enclosure that surrounds the motorcycle. The enclosure has a castor wheel on each corner so that it can roll along with the motorcycle before, during and after the wheelie.

ii. Like the previous embodiment, the two vertical structures of the alternate Support Frame each have a trackway.

iii. However there are two differences from the previous embodiment, with the alternate design inasmuch as (a) the trackways are simple, straight vertical trackways and (b) the entire Supporting Frame structure is on sliders such that it can slide forwards and backwards on the low-level enclosure relative to the motorcycle rear wheel.

iv. Therefore as the motorcycle front lifts up during a wheelie, the Restraining Frame lifts up in the vertical trackway. Also, as the motorcycle front lifts up and start to rotate—the horizontal distance between the front forks and rear wheel decreases and this causes the Supporting Frame to slide towards the rear of the motorcycle.

v. Therefore the forwards/backwards movement of the sliding Support Frame combined with the vertical movement of the Restraining Frame in the Supporting Frame results in a radial travel of the Restraint Frame similar to that provided by the fixed curved trackway in the previous embodiment.

vi. This second embodiment is an improvement over the first because the system is able to move in any radial path required by any motorcycle during its wheelie. The first embodiment uses a fixed curve radius trackway that may not be suitable for all motorcycles, therefore different motorcycles may require different trackway geometries. This is because the radius of the required wheelie arc is a function of (a) the motorcycle wheelbase length and (b) the height on the front forks where the Restraint Frame is attached.

vii. The second embodiment can also provide the inflection to the arc of the motorcycle during the wheelie. As described above the inflection removes the driving force and energy for the wheelie. This is achieved by having a limit which stops the sliding Supporting Frame moving back towards the rear of the motorcycle beyond a predetermined critical point. When the Support Frame has reached its forwards/backwards limit and is unable to slide further back towards the motorcycle—the only way for the wheelie angle to increase further is for the Restraint Frame to move up in the vertical trackway in the now stationary Support Frame. As in the previous embodiment this upwards movement in the inflected part of the arc is only possible if the motorcycle itself moves upwards causing the rear wheel to lift off the ground and onto the free-wheeling roller. When the rear wheel lifts off the ground and onto the roller, the energy and driving force for the wheelie is removed and the motorcycle then starts to drop down again. This is a self-limiting, negative-feedback system.

4. Sections 4-8 above have described how the invention constrains the motorcycle at its front and provides a means to allow and also limit the arc of a wheelie. The embodiments described above provide a means for controlling the wheelie while allowing the motorcycle to move forwards at its normal speed. There are two additional embodiments which provide two important additional and different modes of wheelie.

5. Reduced Speed Wheelie. The following configuration allows a motorcycle to perform a wheelie at a speed much less than that normally required by its characteristic torque versus engine speed performance. The engine of a particular motorcycle will only generate enough torque to lift the front up when it is operated above a certain minimum engine and road speed. The present embodiment allows these wheelie conditions to be met at road speeds slower than normal. This is achieved by adding a system of rollers under the motorcycle rear wheel per the following:

i. The base of the Support Frame must form a low-level enclosure that surrounds the motorcycle.

ii. The base of the support frame contains a roller system on which the motorcycle rear wheel sits. The rear wheel sits on two Drive Rollers (they are driven by the motorcycle rear wheel). The two Drive Rollers are connected to a third roller which is a Propelling Roller which is in contact with the ground and propels the motorcycle forwards.

iii. The Drive Rollers are connected to the Propelling Roller via a reducing gear such that when the motorcycle rear wheel spins and causes the Drive Rollers to rotate, they cause the Propelling Roller to rotate at a slower speed. Therefore the motorcycle and the device is propelled along at a speed slower than that which corresponds to the engine speed in normal operation.

iv. The motorcycle is therefore able to generate higher torques at slower road speeds than normal, and can therefore perform wheelies at slower road speeds than normal.

v. Therefore while the motorcycle rear wheel speed might correspond to say a 30 mph road speed, the Propelling Roller is geared down so that the apparatus and motorcycle move along at say 10 mph. This ratio can be modified depending on the motorcycle's natural wheelie speed and the rider's confidence/ability.

vi. This configuration requires a system of rollers at the front of the apparatus on which the motorcycle front wheel sit. This keeps the bike horizontal given the presence of the rear rollers. The ability to perform a wheelie at reduced speed is valuable because the reduced speed wheelie gives the novice more confidence to attempt the technique at the slow speed. It also provides the novice with a safer, slower speed when the technique is attempted. The slow speed also provides the more experienced operator with a different technique to add to his skill-set which can add to the fun of the wheelie experience. The slow speed also means that less ground is covered during the technique—and this can be an advantage when space is limited.

vii In another embodiment the rollers are replaced with skis or skids that are dragged along the ground as the motorcycle moves forward. The skids will generate friction and the motorcycle will have to generate much higher torque than normal to move the bike and frame along the road. This higher torque enables the bike to perform wheelies at slower speeds than normal.

6. Stationary Wheelie. The following configuration allows the motorcycle to perform a wheelie while stationary. This is achieved by having the entire apparatus sit stationary on the ground with no castor wheels. The motorcycle rear wheel sits on a system of rollers which are connected to a means of providing resistance to the rear wheel spinning. This resistance to the rear wheel spinning provides the wheelie-enabling reaction force or "push-back" previously described per Newton's Third Law. This configuration is as follows:

i. The base of the Support Frame must form a low-level enclosure that surrounds the motorcycle.

ii. The base of the support frame contains a roller system on which the motorcycle rear wheel sits. The rear wheel sits on two Drive Rollers that are driven by the motorcycle rear wheel. The two Drive Rollers are connected to a mechanism which provides a means to resist rotation—this means can be comprised of one of the following:

a. A bank of deformable rollers in high-compression contact. The first of these rollers is connected to the Drive Rollers described above. When the motorcycle rear wheel spins, it causes the Drive Rollers to rotate. This then causes the first of the high-compression rollers to rotate. This then causes the rest of the high-compression rollers to rotate. The high-compression contact of the rollers generates (i) high friction resisting their rotation and also (ii) deformation of the rollers; both of these require force to overcome for the rollers to spin. This resistance force is what provides the reaction force to the motorcycle rear wheel which enables the wheelie.

b. An air compressor c. A device which pumps oil through narrow orifices.

7. Points 4-8,10 and 11 have described the three different types of wheelie for which the present invention provides a means for training the rider:

i. Rolling Wheelie—normal speed ii. Rolling Wheelie—reduced speed iii. Stationary wheelie These three configurations provide a three-stage learning process for the novice, starting with the stationary wheelie, then moving onto the slow speed wheelie and finally the normal speed wheelie as skill level and confidence increases.

8. All three apparatus configurations can be used with i. Either the radial path trackway with the Abrupt Stop (section 7.v.a) or the radial path with the Inflected Arc plus Free-Wheeling Roller (section 7.v.b).

ii. Either the curved trackway in the fixed Supporting Frame or the straight vertical trackway in the sliding Support Frame iii. Either with or without a shock absorber placed at the bottom of the trackway to cushion the impact of the motorcycle hitting the ground a sit comes down from a wheelie (this impact often damages the motorcycle shock absorbers when riders perform normal wheelies)

9. Rolling Wheelie—Normal Speed. The simplest form of the invention is the basic apparatus which provides a means for performing a wheelie at normal speed. The preferred embodiment of this configuration so far described is that of section 8 which uses the straight vertical trackway in the sliding Support Frame combined with the free-wheeling roller described in section 9. The actual preferred embodiment of the invention is described per the following:

i. Like the embodiment in section 8, the Support Frame has 2 vertical structures with two horizontal frames linking their top and bottom sections for rigidity and strength. In this embodiment the base of the support frame must form a low-level enclosure that surrounds the motorcycle. The enclosure has a castor wheel on each corner so that it can roll along with the motorcycle before, during and after the wheelie.

ii. Like the embodiment in section 8, the two vertical structures of the alternate Support Frame each have a simple vertical trackway.

iii. In this embodiment, the Supporting Frame is fixed and does not slide forwards/backwards. However, as with the embodiment of section 8, the relative position of the motorcycle rear wheel and the Support Frame does change during the wheelie. This is achieved by the motorcycle rear wheel rolling forwards within the apparatus as the front of the motorcycle lifts up and the Restraint Frame moves upwards in the vertical trackway.

iv. The forwards movement of the motorcycle rear wheel in the apparatus combined with the upwards movement of the Restraining Frame in the vertical trackway creates the previously described arc of the wheelie.

v. This embodiment can be used with the Abrupt Stop radial path or with the Inflected Arc plus Free-Wheeling Roller.

The preferred embodiment uses the rigid non-sliding Support Frame described above combined with the Infected Arc plus a free-wheeling roller. This provides a very simple rigid apparatus to construct, use and maintain.

10. Broadsiding. In an alternative embodiment the restraining frame is fixed to the front forks using a sliding and/or hinged and/or pivoting assembly which allows the forks to rotate within the restraining frame so the rider may practice a controlled lean of the bike to allow "broadsiding" while preventing the bike from falling over to the side. The broadsiding modification allows the forks to rotate in the restraining frame a broadsiding manoeuvre, but still does not allow any great extent of lean of bike (see figures). Another broadsiding embodiment uses a similar configuration of sliding and pivoting assemblies but the hinges pivot in a different plane allowing rotation in a different plane i.e. lean versus steering. To allow the bike to steer and lean, a combination of the embodiments is required such that pivoting can occur in two planes. This is achieved by using a plurality of universal joints in place of the pivots. The broadsiding embodiment may also employ a plurality of cords that are attached to (i) a sturdy feature of the rear of the motorcycle e.g. rear foot pegs and (ii) the top section of the supporting frame. These cords give an additional means of limiting the extent of lean of the motorcycle.

11. Broadside Maneuvers

A variation on the device provides a configuration enabling the rider to practice broadside maneuvers. This embodiment uses one or more cords is attached to both sides of the rear section of the motorcycle wherein the cords are also attached to the top of the support of the frame per FIG. 12. The cords limit the degree that the motorcycle can lean during broadside practice As the lean angle increases, the limit of the cord length is reached and no more lean is possible preventing the bike from tipping over on its side during a broadside maneuver.

12. Top Frame Rotation

In another embodiment the top frame may rotate relative to the bottom frame when a suitable directional force is applied on the top frame. The rotation is in the plane of the bottom frame and the support frame rotates co-axially to the forks. Such rotation allows the front forks to steer in the device.

13. The Inflected Arc

A variation on the fixed radius trackway in the wheelie device is the Inflected Trackway. In geometry, the term 'inflection' is normally used to mean a change from convex to concave curvature or vice versa. This is the meaning of the term in the present invention. The advantages of the inflected trackway over the constant radius trackway include the following:

i. With the constant radius trackway, when the motorcycle wheelie goes too far and reaches the end of the trackway, the motorcycle continues to exert the turning force (or "moment") of the wheelie directly onto the end of the trackway. Therefore the wheelie is stopped—and the bike is prevented from tipping over—by the mechanical strength and balance of the wheelie device "pushing" back on the bike.

ii. With the inflected trackway this is prevented because:

a. At a certain point between say 60 and 80° the arc of the trackway changes and curves upwards (or inflects) such that when the motorcycle wheelie reaches the inflection, the motorcycle follows the inflection and therefore rises up according to the path of the inflection, Figure A.

b. There is a freewheeling roller (FIG. 11) which is fixed to the cage and which sits in front of the motorcycle rear wheel. The motorcycle is positioned such that the rear wheel pushes against this freewheeling roller. However despite this contact, before the inflection, the weight of the motorcycle is carried on rollers (b) and (c) which provide the reaction/pushback which enables the wheelie—so roller (a) has no effect at this stage.

c. When the wheelie reaches the inflection—the motorcycle starts to lift up as previously described. As the motorcycle starts to lift up, it starts to ride off rollers (b) and (c) and up onto roller (a). Roller (a) is freewheeling and provides no reaction/pushback. Therefore as the motorcycle weight transitions from rollers (b) and (c) onto roller (a), the reaction/pushback suddenly decreases and the driving force for the wheelie diminishes and so the motorcycle starts to fall down again back onto rollers (b) and (c). The loss of pushback also causes the motorcycle engine revs to suddenly increase. The rider feels this limit to the wheelie and the increase in engine revs and therefore reduces the power to keep the bike away from the inflection. He then learns to balance the wheelie before the inflection point.

d. The inflection is positioned so that the above process happens before the tipping point. Therefore the motorcycle cannot tip over backwards. The inflected trackway has removed the need for a mechanical "abrupt stop" to the wheelie—which the constant radius trackway needs- and simply relies on the trackway geometry to remove the wheelie power at the limit position. This is a self correcting, self limiting, negative feedback system. The inflection makes it (i) energetically and (ii) geometrically impossible for the wheelie to go beyond the safety limit. It is energetically impossible because the reduction in "push-back" to the rear wheel removes the energy for the wheelie. It is geometrically impossible because the vertical angle of the bike is limited because the bike cannot move forward beyond the free-wheeling roller and the front of the bike cannot move backwards beyond the inflection. These limits to the bike's movement give an energetic and geometrical limit to wheelie angle.

Figure 11:
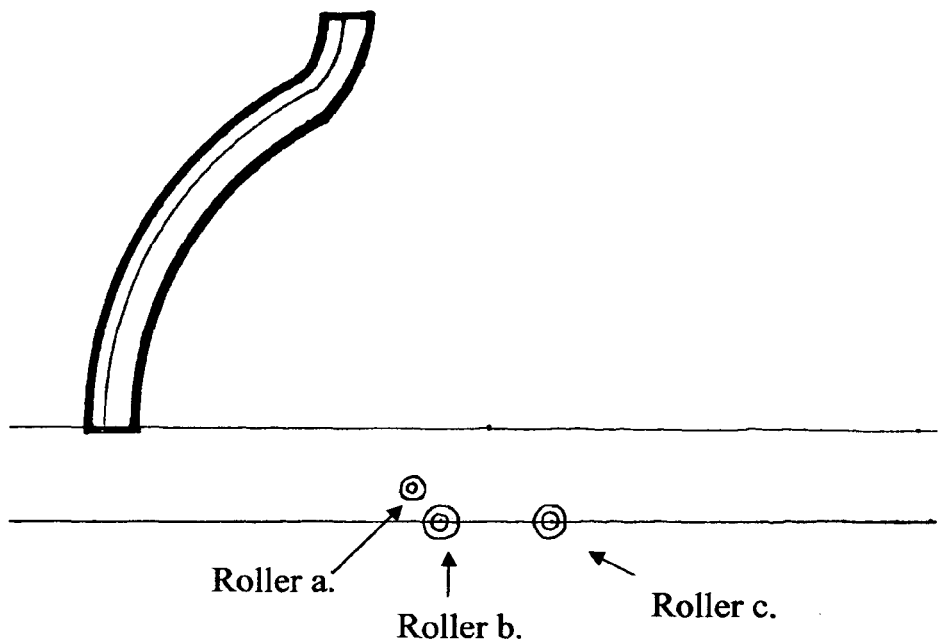
FIGS. 11A-F illustrates use of the device employing an inflected arc trackway and free-wheeling roller mounted on the bottom frame.
Figure 11:
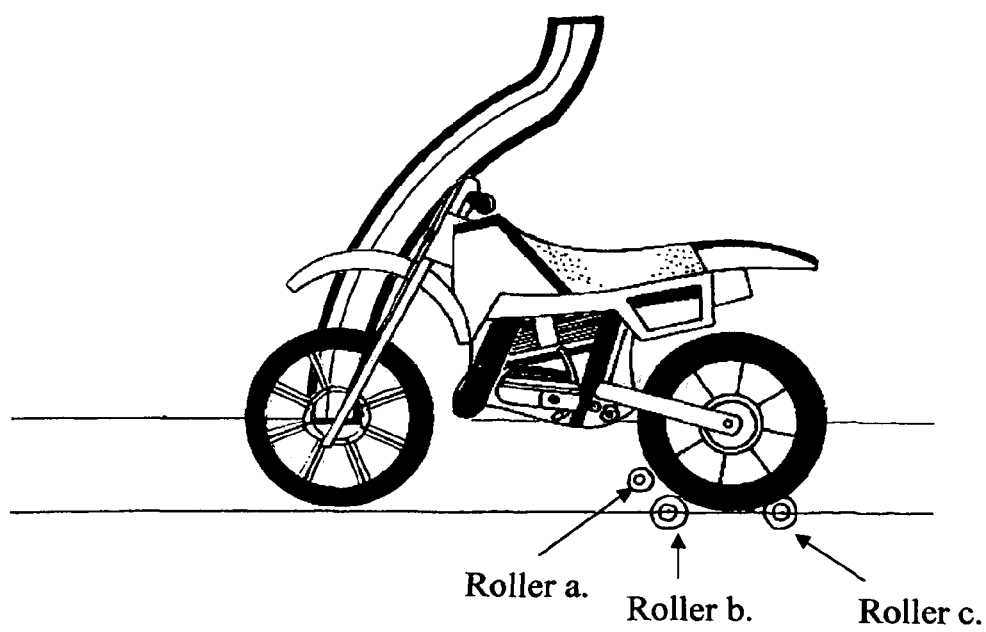
Figure 11:
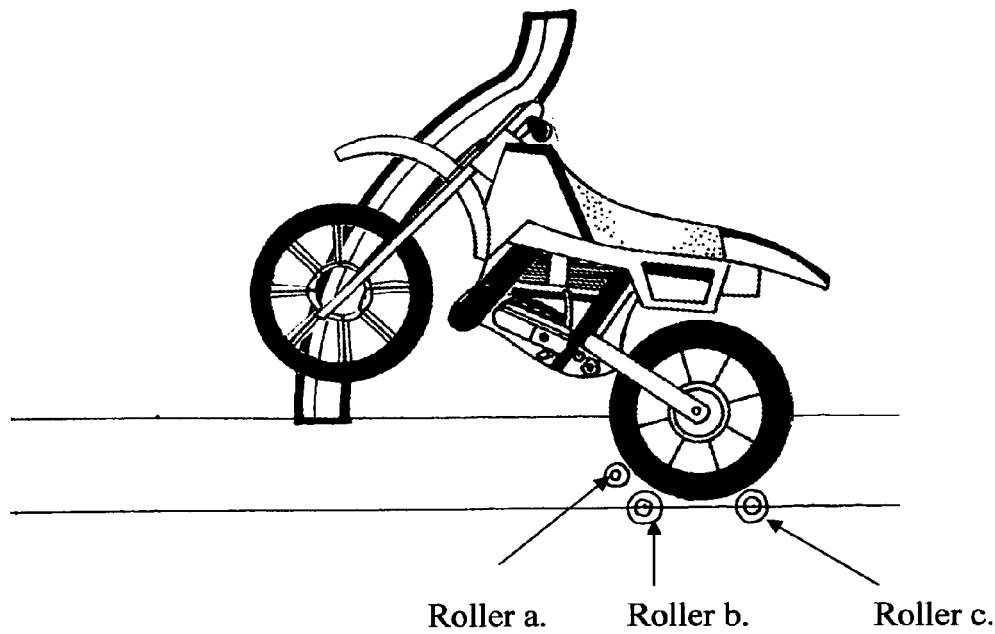
Figure 11:
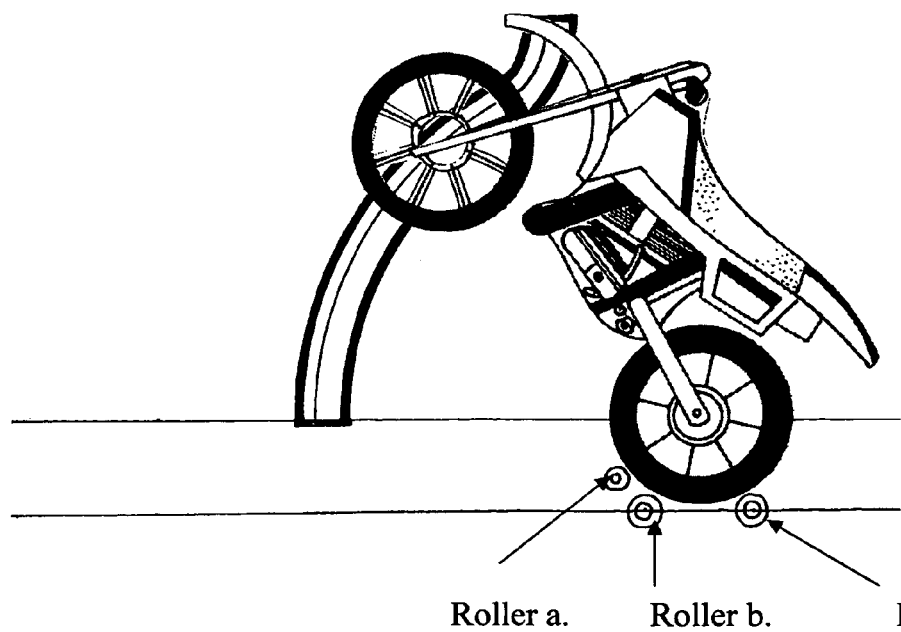
Figure 11:
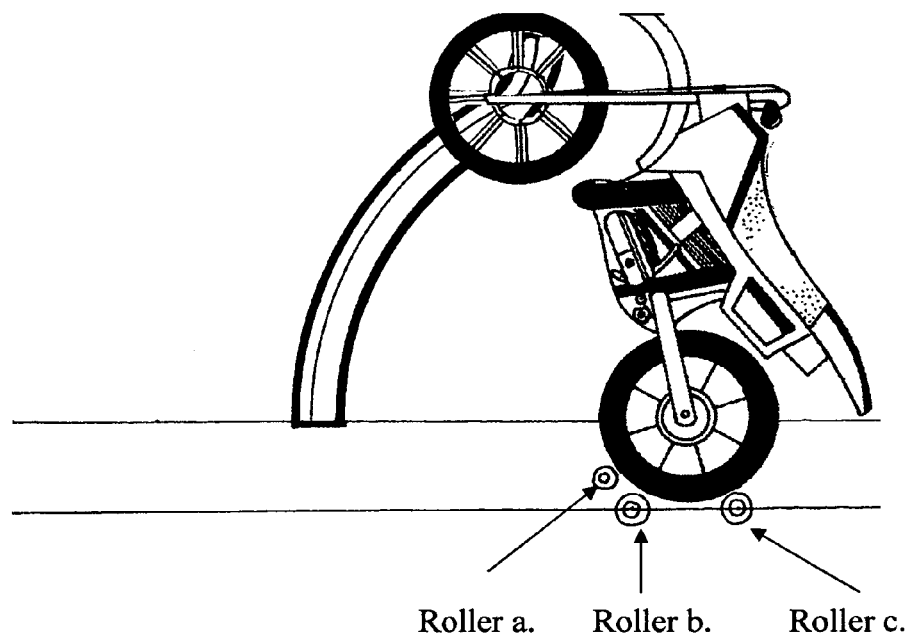
Figure 11:
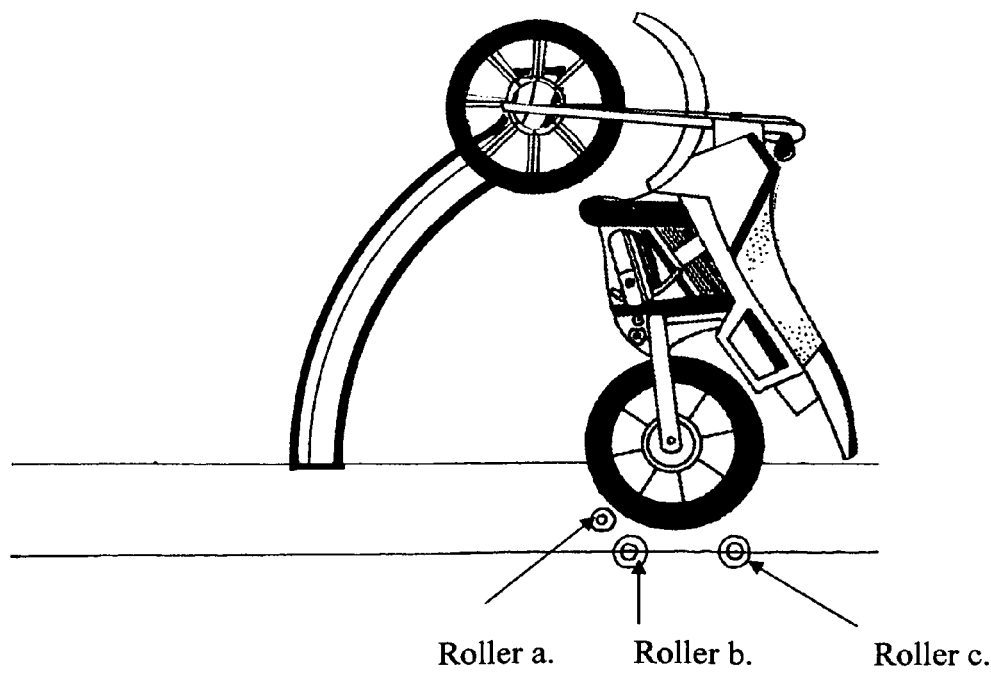

FIG. 11 illustrates this process. The wheelie cage/frame is not shown since a view of the trackway alone is sufficient to explain the principle of operation. In FIG. 11F, the bike has moved onto freewheeling roller (a). The figures do not show the bike falling back onto rollers (b) and (c) because this would look just like FIG. 11E.

The inflected trackway variant works with all embodiments described herein since the motorcycle rear wheel is either lifted off the ground and onto free-wheeling roller (a) or it's lifted off the Drive Rollers onto and onto free-wheeling roller (a). FIG. 11 shows two configurations that use Drive Rollers for reduced speed or stationary wheelies.

The inflected arc can either result from the curved trackway in the fixed Support Frame or from the straight vertical trackway in sliding Support Frame.

The invention claimed is:

1. An apparatus for safely training a rider of a two-wheeled or a three-wheeled vehicle having front forks to perform a wheelie, the apparatus comprising a restraining frame that is fixed directly to the front forks of the vehicle, wherein the restraining frame comprises a right securing means and a left securing means by which the restraining frame is fixed directly to the vehicle, wherein the right securing means is securely and directly fixed to the right front fork, and the left securing means is securely and directly fixed to the left front fork, and wherein the restraining frame further comprises a right outer arm and a left outer arm;

and a support frame, wherein the support frame comprises a horizontal bottom frame, and a top frame mounted upon the bottom frame, wherein the top frame comprises two vertical and approximately parallel side walls, and a top structure fixed to both side walls, wherein each side wall defines one trackway disposed therein so as to provide an opposing pair of trackways, wherein each trackway is shaped and sized so as to accept an outer arm of the restraining frame, so that said outer arm may be slideably confined within the trackway, and wherein the restraining frame is slideably moveable within, but restricted by, the geometry of the trackways, wherein the trackways are shaped as an arc or an inflected arc.

2. The apparatus of claim 1 further comprising at least one roller mounted within the bottom frame such that the roller is positioned forward of the rear wheel(s) when the vehicle has all wheels on the ground but such that when performing a wheelie the rear wheel(s) move(s) forward to contact the roller.

3. The apparatus of claim 2 wherein the bottom frame further comprises a plurality of wheels mounted upon the underside thereof.

4. The apparatus of claim 2 wherein the bottom frame further comprises skids mounted upon the underside thereof.

5. The apparatus of claim 2 wherein each of the opposing pair of trackways is selected from the group consisting of: a trackway that is shaped as an arc, a trackway that is shaped as an inflected arc, a trackway that is straight.

6. The apparatus of claim 5 wherein each of the opposing pair of trackways is shaped as an arc.

7. The apparatus of claim 5 wherein each of the opposing pair of trackways is shaped as an inflected arc.

8. The apparatus of claim 2 wherein the right outer arm and the left outer arm of the restraining frame are hinged and/or pivoted so as to allow the forks to move relative to the head portions of the outer arms.

9. The apparatus of claim 2 wherein the bottom frame has a front end and a back end and wherein the bottom frame and the top frame or a portion thereof, may move relative to each other when a force is applied on the top frame such that the top frame may slide forwards and backwards upon the bottom frame.

10. The apparatus of claim 9 wherein the trackways are straight trackways.

11. The apparatus of claim 10 wherein the trackways are vertical.

12. The apparatus of claim 2 wherein the right securing means and the left securing means are each selected from the group consisting of: a clamp, a strap, a nut-and-bolt system, a luer-lock system, a slot-and-flange system, a mechanical c-clamp type connector, and a ratcheting high-tensile cord.

13. The apparatus of claim 12 wherein the right securing means and the left securing means are each selected from the group consisting of: a clamp and a mechanical c-clamp type connector.

14. A system comprising a two-wheeled or a three-wheeled vehicle having front forks, and an apparatus for safely training a rider to perform a wheelie, the apparatus comprising a restraining frame that is fixed directly to the front forks of the vehicle, wherein the restraining frame comprises a right securing means and a left securing means by which the restraining frame is fixed directly to the vehicle, wherein the right securing means is securely and directly fixed to the right front fork, and the left securing means is securely and directly fixed to the left front fork, and wherein the restraining frame further comprises a right outer arm and a left outer arm; and a support frame, wherein the support frame comprises a bottom frame and a top frame mounted upon the bottom frame, wherein the top frame comprises two vertical and approximately parallel side walls, wherein each side wall defines one trackway disposed therein so as to provide an opposing pair of trackways, wherein each trackway is shaped and sized so as to accept an outer arm of the restraining frame, and wherein the restraining frame is slideably moveable within, but restricted by, the geometry of the trackways, wherein the trackways are shaped as an arc or an inflected arc, and wherein the range of motion of the vehicle is restricted so that the center of gravity always remains forward of the axis of the rear wheel(s), thereby preventing the vehicle from tipping over backwards.

15. The system of claim 14 wherein each of the opposing pair of trackways is selected from the group consisting of: a trackway that is shaped as an arc, a trackway that is shaped as an inflected arc, a trackway that is straight.

16. The system of claim 14 wherein the bottom frame further comprises skids or wheels mounted upon the underside thereof.

17. The system of claim 14 wherein the horizontal bottom frame and a top frame may move relative to each other when a force is applied on the top frame such that the top frame may slide forwards and backwards upon the bottom frame.

18. The system of claim 14 further comprising at least one roller mounted within the bottom frame such that the roller is positioned forward of the rear wheel(s) when the vehicle has all wheels on the ground but such that when performing the wheelie the rear wheel(s) move(s) forward to contact the roller.

19. The system of claim 14 wherein the right outer arm and the left outer arm of the restraining frame are hinged and/or pivoted so as to allow the forks to move relative to the head portions of the outer arms.

20. An apparatus for safely training the rider of a two-wheeled or a three-wheeled vehicle having front forks, to perform a wheelie, the apparatus comprising a restraining frame that is fixed directly to one of the front forks of the vehicle, wherein the restraining frame comprises a securing means by which the restraining frame is fixed directly to the vehicle, wherein the securing means is securely and directly fixed to one of the front forks, and at least one outer arm extending from the securing means; and a support frame, wherein the support frame comprises a horizontal bottom frame, and a top frame mounted upon the bottom frame; wherein the top frame comprises at least one vertical side structure, wherein the vertical side structure defines a trackway shaped and sized so as to accept the outer arm of the restraining frame, so that said outer arm may be slideably confined within the trackway, and wherein the restraining frame is slideably moveable within, but restricted by, the geometry of the trackway, wherein the trackway is shaped as an arc or an inflected arc.

* * * * *